(12) United States Patent
Chen et al.

(10) Patent No.: US 11,156,908 B2
(45) Date of Patent: Oct. 26, 2021

(54) LIGHT SOURCE DEVICE AND PROJECTION DISPLAY SYSTEM THEREOF FOR ADJUSTMENT OF WHITE BALANCE

(71) Applicant: APPOTRONICS CORPORATION LIMITED, Guangdong (CN)

(72) Inventors: Hongyun Chen, Guangdong (CN); Yi Li, Guangdong (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 0 days.

(21) Appl. No.: 16/490,779

(22) PCT Filed: Nov. 3, 2017

(86) PCT No.: PCT/CN2017/109338
§ 371 (c)(1),
(2) Date: Sep. 3, 2019

(87) PCT Pub. No.: WO2018/157618
PCT Pub. Date: Sep. 7, 2018

(65) Prior Publication Data
US 2020/0012177 A1 Jan. 9, 2020

(30) Foreign Application Priority Data
Mar. 3, 2017 (CN) .......................... 201710122399.4

(51) Int. Cl.
*G03B 21/20* (2006.01)
*G02B 26/00* (2006.01)

(52) U.S. Cl.
CPC ......... *G03B 21/204* (2013.01); *G02B 26/008* (2013.01); *G03B 21/2053* (2013.01); *G03B 21/2066* (2013.01)

(58) Field of Classification Search
CPC .. G03B 21/204; G03B 21/20; G03B 21/2033; G03B 21/2053; G03B 21/2066; G02B 26/008
See application file for complete search history.

(56) References Cited

U.S. PATENT DOCUMENTS

| | | | | |
|---|---|---|---|---|
| 8,366,278 B2 * | 2/2013 | Kurosaki | ............ | G03B 21/204 353/98 |
| 8,403,492 B2 * | 3/2013 | Shibasaki | ............ | G03B 21/204 353/31 |

(Continued)

FOREIGN PATENT DOCUMENTS

| CN | 102566230 A | 7/2012 |
|---|---|---|
| CN | 102748745 A | 10/2012 |

(Continued)

OTHER PUBLICATIONS

International Search Report and Written Opinion for Application No. PCT/CN2017/109338 dated Feb. 8, 2018.

*Primary Examiner* — Bao-Luan Q Le
(74) *Attorney, Agent, or Firm* — Marshall, Gerstein & Borun LLP

(57) ABSTRACT

A light source device and a projection display system. The light source device comprises: a first light source (301) used for emitting a first light; a wavelength conversion unit (303) provided with at least two areas, that being a first area and a second area, the first area and the second area emitting the first light and the excited light in a time-division manner; a second light source (302) used for emitting a second light; a light splitting and merging component (304) used for guiding the first light, the excited light, and the second light, allowing the first light emitted by the wavelength conversion unit (303), the excited light, and the second light to converge (Continued)

and then be emitted in a same direction. The light source device increases brightness while keeping balance of the white light.

17 Claims, 5 Drawing Sheets

(56) References Cited

U.S. PATENT DOCUMENTS

| | | | | |
|---|---|---|---|---|
| 8,556,432 | B2* | 10/2013 | Masuda | G03B 21/145 |
| | | | | 353/31 |
| 8,723,142 | B2* | 5/2014 | Kurosaki | G03B 21/28 |
| | | | | 250/483.1 |
| 8,854,725 | B2* | 10/2014 | Hamada | G03B 33/06 |
| | | | | 359/326 |
| 8,957,366 | B2* | 2/2015 | Miyazaki | G03B 33/08 |
| | | | | 250/226 |
| 9,175,829 | B2* | 11/2015 | Mehl | F21S 10/007 |
| 9,348,204 | B2* | 5/2016 | Chiu | G03B 33/08 |
| 9,594,296 | B2* | 3/2017 | Fujita | G02B 27/143 |
| 9,631,792 | B2* | 4/2017 | Hu | G02B 19/0047 |
| 9,664,892 | B2* | 5/2017 | King | G02B 26/008 |
| 9,778,553 | B2* | 10/2017 | Hu | G03B 21/204 |
| 9,897,907 | B2* | 2/2018 | Hsieh | G03B 33/08 |
| 10,078,214 | B2* | 9/2018 | Liao | G02B 27/141 |
| 10,114,210 | B2* | 10/2018 | Tian | G02B 26/008 |
| 10,139,713 | B2* | 11/2018 | Guo | H04N 9/3161 |
| 10,203,591 | B2* | 2/2019 | Hu | G03B 21/206 |
| 10,288,992 | B2* | 5/2019 | Chang | G03B 33/06 |
| 10,379,432 | B2* | 8/2019 | Chen | G03B 21/008 |
| 10,386,705 | B2* | 8/2019 | Hu | G03B 21/008 |
| 10,488,744 | B2* | 11/2019 | Liao | G03B 33/08 |
| 2010/0328554 | A1 | 12/2010 | Shibasaki | H04N 9/3161 |
| | | | | 348/760 |
| 2010/0328632 | A1* | 12/2010 | Kurosaki | G03B 21/204 |
| | | | | 353/98 |
| 2012/0026472 | A1* | 2/2012 | Masuda | G03B 21/204 |
| | | | | 353/85 |
| 2013/0083297 | A1* | 4/2013 | Miyazaki | G03B 33/08 |
| | | | | 353/31 |
| 2013/0114044 | A1* | 5/2013 | Inoue | G03B 21/28 |
| | | | | 353/31 |
| 2013/0258639 | A1* | 10/2013 | Hu | F21V 9/08 |
| | | | | 362/84 |
| 2014/0029237 | A1* | 1/2014 | Mehl | F21V 9/08 |
| | | | | 362/84 |
| 2014/0071683 | A1* | 3/2014 | Hamada | H01L 33/50 |
| | | | | 362/259 |
| 2014/0226306 | A1* | 8/2014 | Khan | H04N 9/3158 |
| | | | | 362/84 |
| 2014/0253882 | A1* | 9/2014 | King | G02B 26/008 |
| | | | | 353/31 |
| 2014/0362349 | A1* | 12/2014 | Chiu | H04N 9/3158 |
| | | | | 353/31 |
| 2015/0253653 | A1* | 9/2015 | Fujita | G03B 33/08 |
| | | | | 353/31 |
| 2015/0316775 | A1* | 11/2015 | Hsieh | G03B 21/204 |
| | | | | 353/31 |
| 2016/0004147 | A1* | 1/2016 | Hu | G03B 21/204 |
| | | | | 362/84 |
| 2016/0026076 | A1* | 1/2016 | Hu | G02B 27/0905 |
| | | | | 353/84 |
| 2017/0111620 | A1* | 4/2017 | Tian | H04N 9/3161 |
| 2017/0315431 | A1* | 11/2017 | Schnarrenberger | F21V 13/14 |
| 2018/0024426 | A1* | 1/2018 | Chen | H04N 9/3158 |
| | | | | 362/84 |
| 2018/0129123 | A1* | 5/2018 | Guo | H04N 9/3161 |
| 2018/0129124 | A1* | 5/2018 | Hu | G03B 21/20 |
| 2018/0173087 | A1* | 6/2018 | Hsieh | G03B 21/204 |
| 2018/0231879 | A1* | 8/2018 | Chang | G03B 21/2033 |

FOREIGN PATENT DOCUMENTS

| | | |
|---|---|---|
| CN | 105988269 A | 10/2016 |
| CN | 205992115 U | 3/2017 |
| JP | 2008052070 A | 3/2008 |

\* cited by examiner

LIGHT SOURCE DEVICE AND PROJECTION DISPLAY SYSTEM THEREOF FOR ADJUSTMENT OF WHITE BALANCE

TECHNICAL FIELD

The present disclosure relates to the field of projection technologies, and more particularly, to a light source device and a projection display system.

BACKGROUND

In the existing projection technology, a blue exciting light is used to excite a fluorescent wheel to generate excited light. As shown in FIG. 1, a light source 1 emits the blue exciting light, and the fluorescent wheel 2 receives the exciting light and generates time-sequence red, green, and red excited light. After being shaped, the excited light is incident on a light modulator. The fluorescent wheel 2 includes at least three regions: a region for transmitting the blue exciting light, a region for receiving the exciting light and converting it to generate green excited light, and a region for receiving the exciting light and converting it to generate red excited light. Since more red image light is required in an image, using such a light source will cause brightness of the red image light to be insufficient.

In order to compensate for the problem of insufficient red image light, a light source device with dual light sources is used. As shown in FIG. 2, it includes a first light source 11 that emits blue exciting light, a second light source 12 that emits a red exciting light, a fluorescent wheel 2, a first dichroic mirror 3, and a second dichroic mirror 4. The exciting light generated by the first light source 11 is incident on the fluorescent wheel 2, and the fluorescent wheel 2 receives the exciting light and converts it to generate green excited light. The green excited light emitted from a surface of the fluorescent wheel and the blue exciting light that is not absorbed by phosphors on the fluorescent wheel and instead is reflected on the fluorescent wheel are incident on a surface of the first dichroic mirror 3 together. This surface of the first dichroic mirror 3 is provided with a function of rotating or disturbing a polarized light, such that the blue exciting light reflected from the surface of the fluorescent wheel 2 can be effectively reflected by the first dichroic mirror 3. The blue exciting light and the green excited light which are emitted from the first dichroic mirror 3 are transmitted from the second dichroic mirror 4. The red excited light generated by the second light source 12 is reflected by the second dichroic mirror 4 and then emitted in the same optical path direction as the blue exciting light and the green excited light. This light source can effectively compensate for the problem of insufficient brightness of red light in the image light, but it also brings another problem that it is difficult to adjust white balance of a white light emitted from the second dichroic mirror 4.

In projection light sources, a problem that the white balance of the emitted white light cannot be well adjusted appears in light sources of the related art. On the one hand, since amount of the green light is slightly more, the overall brightness is slightly low when adjusting a throughput of the green light. On the other hand, when the throughput of the green light is kept constant, and a red light is increased by adjusting a current, a situation in which the light source operates under a high current and a high load for a long time easily occurs, so that service life of the light source is shortened. Furthermore, increasing an amount of the red light by increasing the number of the red lights will cause an increase in a volume of the light source and thus result in an overall increase in volume and an increase in the cost of a product. Therefore, how to maintain the white balance while increasing the brightness is a difficult technical problem that the current projection needs to solve.

SUMMARY

Technical Solution

A technical problem to be solved by the present disclosure is to provide a light source device and a projection display system thereof, aiming at solving the problem of the balance of the white light.

The present disclosure is achieved as follows. A light source device is provided, including:

a first light source configured to emit first light;

a wavelength conversion unit having at least two regions, wherein the at least two regions comprise a first region and a second region, the first region is configured to receive the first light, scatter the first light and then emit it, and the second region is configured to receive the first light and be excited to generate excited light; the first region and the second region emit the first light and the excited light in a time-sequence manner;

a second light source configured to emit second light, wherein a wavelength range of the second light is within a wavelength range of the excited light;

a light splitting-combining assembly configured to guide the first light, the excited light and the second light, so as to cause the first light to be incident on the at least two regions of the wavelength conversion unit in a time-sequence manner and cause the first light and the excited light which are emitted from the wavelength conversion unit and the second light to be converged and then be emitted in a same direction.

Further, the excited light comprises light having a same color as the second light and light having a different color from the second light;

the light splitting-combining assembly is configured to guide the first light and the second light from a first side of the wavelength conversion unit to the wavelength conversion unit, the wavelength conversion unit is configured to emit scattered first light, the excited light having the same color as the second light, and the second light from a second side different from the first side of the wavelength conversion unit, and the wavelength conversion unit is configured to emit the excited light having the different color from the second light from the first side of the wavelength conversion unit;

the light splitting-combining assembly is configured to combine the lights in wavelength, wherein the lights comprise light emitted from the first side of the wavelength conversion unit and light emitted from the second side of the wavelength conversion unit.

Further, the excited light comprises light having a same color as the second light and light having a different color from the second light;

the light splitting-combining assembly is configured to guide the first light from a first side of the wavelength conversion unit to the wavelength conversion unit, the wavelength conversion unit is configured to emit scattered first light from a second side different from the first side of the wavelength conversion unit, and the wavelength conversion unit is further configured to emit, from the first side of the wavelength conversion unit, excited light generated by excitation;

the light splitting-combining assembly is configured to combine, in etendue, the light emitted from the first side of the wavelength conversion unit with the second light, and then combine, in wavelength, the light that has been combined in entedue with the light emitted from the second side of the wavelength conversion unit.

Further, the excited light comprises light having a same color as the second light and light having a different color from the second light;

the light splitting-combining assembly is configured to guide the first light and the second light from a first side of the wavelength conversion unit to the wavelength conversion unit, the wavelength conversion unit is configured to emit scattered first light, the excited light having the same color as the second light, and the second light from the first side of the wavelength conversion unit, and the wavelength conversion unit is configured to emit the excited light having the different color from the second light from a second side different from the first side of the wavelength conversion unit;

the light splitting-combining assembly is configured to combine the lights emitted from the first side and the second side of the wavelength conversion unit.

Further, the light splitting-combining assembly comprises a light splitting element, a light guiding element and a light combining element;

the light splitting element is disposed on an emission optical path of the first light and is configured to transmit the first light and reflecting light emitted from the first side of the wavelength conversion unit, or transmitting the first light and the second light and reflecting light emitted from the first side of the wavelength conversion unit;

the light guiding element is configured to guide the light, that is emitted from the light splitting element after being reflected, to the light combining element;

the light combining element is configured to converge light guided-in by the light guiding element and light emitted from the second side of the wavelength conversion unit into one beam of light and then emit it in a same direction;

the wavelength conversion unit is configured to emit scattered first light to the light splitting element or the light combining element and emit the excited light to the light splitting element, or emit at least a portion of the excited light to the light splitting element and emit a remaining portion to the light combining element.

Further, the light splitting element comprises a first transmitting region, a second transmitting region, and a first reflecting region;

the first light is transmitted from the first transmitting region into the wavelength conversion unit, the second light is transmitted from the second transmitting region into the wavelength conversion unit, and light emitted from the first side of the wavelength conversion unit is reflected by the first reflecting region to the light guiding element.

Further, the light guiding element comprises a first reflecting element and a second reflecting element, the first light is transmitted from the light splitting element to be incident on the wavelength conversion unit, and the second light is transmitted from the second reflecting element into the light combining element;

the first reflecting element is disposed on an optical path of at least a portion of excited light emitted by the light splitting element, and is configured to reflect at least the portion of the excited light into the second reflecting element;

the second reflecting element comprises a third transmitting region and a second reflecting region, the third transmitting region is configured to transmit the second light into the light combining element, and the second reflecting region is configured to reflect at least a portion of excited light, that is reflected from the first reflecting element, to the light combining element.

Further, the light source device further includes a control unit, and the control unit is configured to control the first light source and the second light source to be turned on or turned off in a time-sequence manner.

Further, during one rotation cycle of the wavelength conversion unit, the control unit is configured to control the first light source to be maintained in a turned-on state in one cycle, and control the second light source to be in a turned-on state only during a period corresponding to a portion of the second region of the wavelength conversion unit.

Further, the second region comprises at least a first sub-region and a second sub-region, the first sub-region is provided with a red fluorescent material, and the second sub-region is provided with a green fluorescent material;

during one rotation cycle of the wavelength conversion unit, the control unit is configured to control the first light source to be maintained in a turned-on state in one cycle, and the control unit is configured to control the second light source to be in a turned-on state during a period corresponding to the first sub-region of the wavelength conversion unit and in the turned-on state during a period corresponding to a portion of the second sub-region of the wavelength conversion unit.

Further, the second region comprises at least a first sub-region and a second sub-region, and the first sub-region and the second sub-region are respectively provided with different wavelength conversion materials.

Further, the first sub-region is configured to receive the first light and be excited to generate excited light of a first wavelength range, and the excited light of the first wavelength range is transmitted from the first sub-region; the second sub-region is configured to receive the first light and be excited to generate excited light of a second wavelength range, and the excited light of the second wavelength range is reflected and emitted from the second sub-region;

or, the first sub-region is configured to receive the first light and be excited to generate excited light of a first wavelength range, the excited light of the first wavelength range and the second light are transmitted from the first sub-region, the second sub-region is configured to receive the first light and be excited to generate excited light of the second wavelength range, and the excited light of the second wavelength range is reflected and emitted from the second sub-region.

Further, the second sub-region comprises a transmitting sub-region and a reflecting sub-region, the transmitting sub-region is configured to transmit the second light, and the reflecting sub-region is configured to reflect the excited light of the second wavelength range.

Further, the light source device further includes a light filter unit, and the light filter unit is disposed in a direction of an emission light of the light splitting-combining assembly, and is configured to filter and emit the converged light.

The present disclosure also provides a projection display system, and the projection display system includes the light source device described in any one of the aspects above.

Beneficial Effect

Compared with the related art, the present disclosure has following beneficial effects. The light source device generates an excited light by being excited by a first light source incident on a wavelength conversion unit. A combined light of the excited light and the first light is a white light. That is, the combined light of the excited light and the first light includes light of three primary colors required for imaging an image. The second light emitted by the second light source has a wavelength range that is within a wavelength range of the excited light, and it can supplement a light of a certain wavelength range in the excited light, thereby increasing the brightness. Moreover, because the excited light and the first light which are emitted from the wavelength conversion unit and the second light are combined into a white light, the balance of the white light can be well adjusted, which not only ensures the brightness but also effectively controls the number of the light sources and the time during which the light source is turned-on.

DESCRIPTION OF EMBODIMENTS

Figure 1:
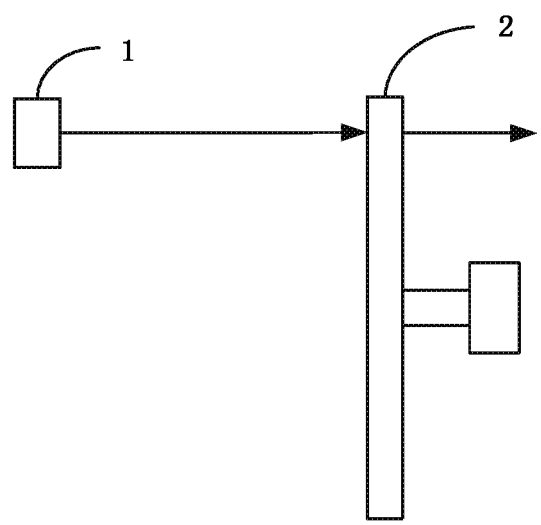
FIG. 1 is a structural schematic diagram of a light source in the related art.
Figure 2:
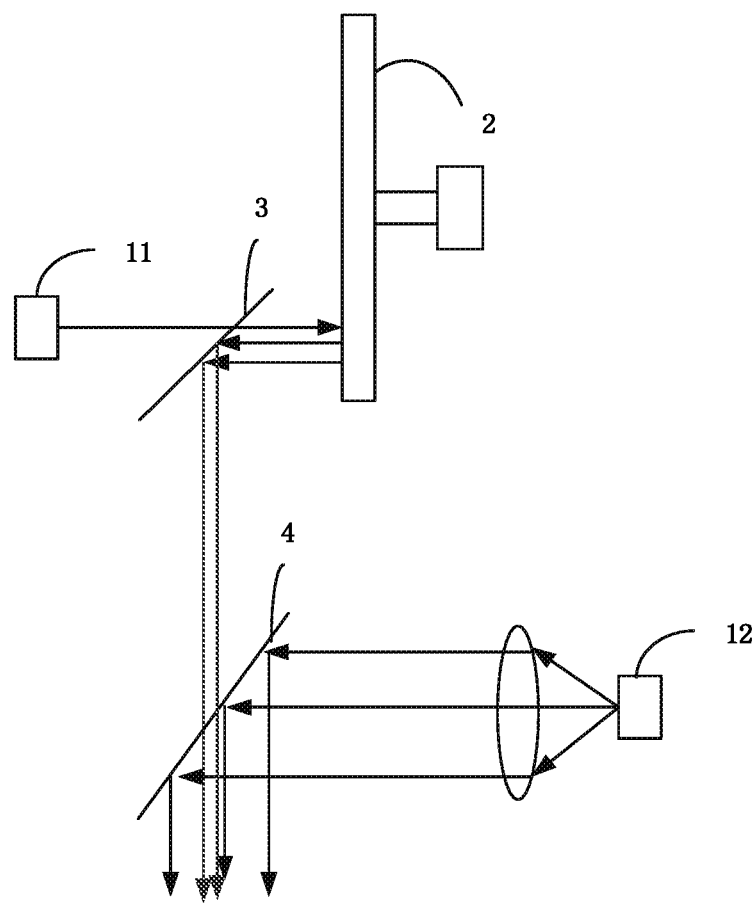
FIG. 2 is another structural schematic diagram of a light source in the related art.

The present disclosure will be further described in detail below referring to the accompanying drawings and embodiments in order to make the objects, technical solutions and advantages of the present disclosure more understandable and clear. It is understood that the specific embodiments described herein are merely illustrative of the present disclosure and are not intended to limit the present disclosure.

A light source device of the present disclosure uses two kinds of light sources, which are a first light source and a second light source, respectively. The first light source generates exciting light, and the exciting light excites a wavelength conversion unit to generate excited light. The light emitted by the time-sequence light emitted from the wavelength conversion unit in one cycle is combined into white light. The second light source generates second light, and the second light is used as supplemental light. The time-sequence light emitted from the wavelength conversion unit is combined with the second light, to supplement light of a certain wavelength range in the image light. The first light emitted by the first light source and the second light emitted by the second light source may both pass through the wavelength conversion unit and then be emitted; or, it is possible that the first light emitted by the first light source passes through the wavelength conversion unit, while the second light emitted by the second light source doesn't pass through the wavelength conversion unit. The lights emitted by the light sources in these two arrangement modes are combined by a light splitting-combining assembly. Since the combined light of the light emitted by the time-sequence light emitted from the wavelength conversion unit in one cycle is the white light, the white balance after the white light and the second light are combined is better.

The light source device of the present disclosure includes a first light source, a second light source, a wavelength conversion unit, and a light splitting-combining assembly. Specifically, the first light source is used for emitting first light; the wavelength conversion unit has at least two regions, the at least two regions are a first region and a second region, the first region receives the first light, scatters the first light and then emits it, and the second region receives the first light and is excited to generate excited light, and the first region and the second region emit the first light and the excited light in a time-sequence manner; the second light source is used for emitting second light, and a wavelength range of the second light is within a wavelength range of the excited light; the light splitting-combining assembly is used for guiding the first light, the excited light and the second light, so as to cause the first light to be incident on the at least two regions of the wavelength conversion unit in a time sequence and cause the first light and the excited light which are emitted from the wavelength conversion unit and the second light to converge and then be emitted in the same direction.

The wavelength range of the second light is within the wavelength range of the exited light. That is, a color of the second light is the same as a color of at least a portion of the excited light. For example, the color of the second light is red, and the color of the excited light may be yellow, red and green or magenta. As another example, the color of the second light is green, and the color of the excited light may be yellow, red, green or cyan.

The light-emitting device can provide primary lights of an image to be displayed by time-sequence combining the exciting light and the excited light which are emitted from the wavelength conversion unit. On this basis, the second light is added as a supplemental light, and the supplemental light and the excited light and the first light can achieve a better white balance, thereby making up for the brightness and chromaticity of a certain component of light in the image.

On the basis of the above light source device, the excited light generated by exciting the wavelength conversion unit includes light having the same color as the second light and light having a different color from the second light. The light splitting-combining assembly guides the first light and the second light from a first side of the wavelength conversion unit to the wavelength conversion unit, the wavelength conversion unit emits the scattered first light, the excited light having the same color as the second light, and the second light from a second side of the wavelength conversion unit different from the first side, and the wavelength conversion unit emits the excited light having a different color from the second light from the first side of the wavelength conversion unit. The light splitting-combining assembly combines in wavelength the lights emitted from the first side and the second side of the wavelength conversion unit.

The idea of wavelength-combining is to combine various beams of light into one beam of light according to characteristics of the different wavelength ranges of the incident lights. Specifically, a light of a certain wavelength range can be transmitted from a same optical element, and a light in a certain wavelength range can be reflected from the same optical element, such that lights incident from different directions are eventually emitted from the same direction.

The above technical solution can be properly modified to obtain a following technical solution.

The light splitting-combining assembly guides the first light from a first side of the wavelength conversion unit to the wavelength conversion unit, the wavelength conversion unit emits the scattered first light from a second side of the wavelength conversion unit different from the first side, and the wavelength conversion unit also emits, from the first side of the wavelength conversion unit, an excited light generated by excitation. The light splitting-combining assembly combines in etendue the light emitted from the first side of the wavelength conversion unit and the second light, and then combines in wavelength the light that has been etendue-combined with the light emitted from the second side of the wavelength conversion unit.

The etendue-combining is to combine several kinds of lights based on a principle of conservation of the optical etendue. For example, one kind of the light can be emitted from a certain region of an optical element and the other lights are emitted from other regions of the optical element other than the above certain region, such that all the lights are converged into one beam of light after passing through the optical element, and then emitted.

The above technical solution can be properly modified to obtain a following technical solution.

The light splitting-combining assembly guides the first light and the second light from a first side of the wavelength conversion unit to the wavelength conversion unit, the wavelength conversion unit emits the scattered first light, the excited light having the same color as the second light, and the second light from a first side of the wavelength conversion unit, and the wavelength conversion unit also emits the excited light having a different color from the second light from a second side of the wavelength conversion unit different from the first side. The light splitting-combining assembly combines the light emitted from the first side and the light emitted from the second side of the wavelength conversion unit.

Specifically, when the light splitting-combining assembly guides the first light and the second light from the first side of the wavelength conversion unit to the wavelength conversion unit, it can split the light using the etendue. That is, according to the principle of the etendue, the first light and the second light is caused to be transmitted from a certain small region of the optical element, and the light emitted from the first side of the wavelength conversion unit is caused to be reflected from other regions of the optical element.

The light source device of the present disclosure can be classified based on the above embodiments, and a number of specific embodiments can be evolved as follows.

Figure 3:
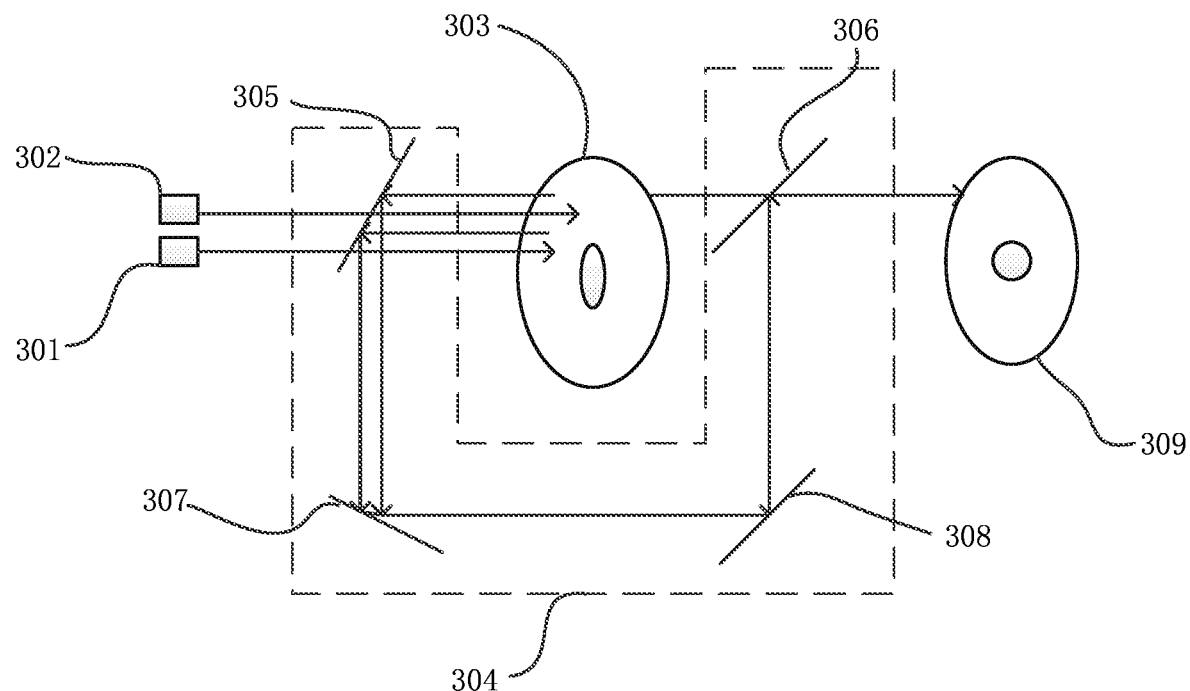
FIG. 3 is a structural schematic diagram of a light source device according to an embodiment of the present disclosure.

Referring to FIG. 3, a light source device is provided, including a first light source 301, a second light source 302, a wavelength conversion unit 303, and a light splitting-combining assembly 304. The first light source 301 is used to emit first light. The wavelength conversion unit 303 has at least two regions. The at least two regions are a first region and a second region. The first region receives the first light, scatters the first light and then emits it. The second region receives the first light and is excited to generate excited light. The second light source 302 is used to emit second light, and a wavelength range of the second light is within a wavelength range of the excited light. The light splitting-combining assembly 304 is used for splitting the first light, the second light, and the light emitted from one side of the wavelength conversion unit into at least two mutually different optical paths for propagation, and is also used for converging the light emitted from the wavelength conversion unit and the second light to cause the converged light to be emitted in the same direction.

The light splitting-combining assembly 304 includes a light splitting element 305, a light guiding element, and a light combining element 306. The light splitting element 305 is disposed on an emission optical path of the first light, for transmitting the first light and reflecting at least a portion of the excited light, or for transmitting the first light and the second light and reflecting at least a portion of the excited light. The light guiding element guides the excited light, which is reflected by and then emitted from the light splitting element 305, to the light combining element 306. The light combining element 306 converges the excited guided-in by the light guiding element, the second light and the light transmitted from the wavelength conversion unit 303 into one beam of light and then emits them in the same direction.

In particular, the light guiding element can include a first reflecting element 307 and a second reflecting element 308. The first reflecting element 307 is disposed in an optical path of at least a portion of the excited light emitted by the light splitting element 305 and reflects at least the portion of the excited light into the second reflecting element 308. The second reflecting element 308 reflects at least a portion of the excited light, that is reflected from the first reflecting element 307, to the light combining element 306.

Each of the first light source 301 and the second light source 302 may be a laser source, an LED light source, or the like. For example, the first light source 301 is a blue laser source, and the second light source 302 is a red laser source.

Figure 4:
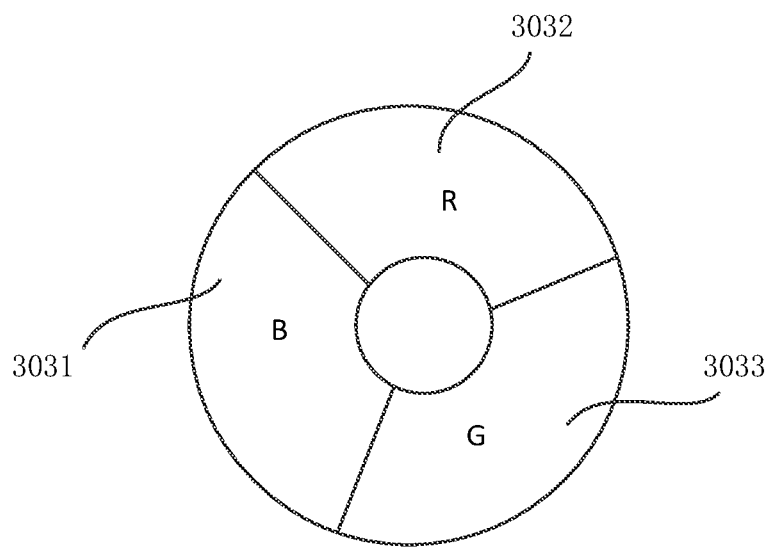
FIG. 4 is a structural schematic diagram of a wavelength conversion unit in the light source device of FIG. 3.

Referring to FIG. 3 and FIG. 4, the wavelength conversion unit 303 has two regions, which are respectively a first region 3031 and a second region. The second region includes a first sub-region 3032 and a second sub-region 3033. The first region 3031 receives the first light, scatters the first light and then emits it. The first sub-region 3032 receives the first light and is excited to generate excited light of one wavelength range. The second sub-region 3033 receives the first light and is excited to generate excited light of another wavelength range. For example, the first region 3031 is a transmitting region and is provided with a scattering material. The first region 3031 receives the first light and scatters the first light, and the scattered first light is emitted from this region in a transmissive manner. When the first light is a blue exciting light, the light emitted from the first region 3031 in a transmissive manner is the blue exciting light. The first sub-region 3032 is provided with a red fluorescent material, and this region is a transmitting region. The first sub-region 3032 receives the first light and is excited to generate red excited light, and the red excited light is emitted from this region in a transmissive manner. The second sub-region 3033 is provided with a green fluorescent material, and this region is a reflecting region. The second sub-region 3033 receives the first light and is excited to generate green excited light, and the green excited light is emitted from this region in a reflective manner.

In combination with the various embodiments described above, the light source device further includes a control unit. The control unit is used to control the first light source 301 and the second light source 302 to be turned on or off in a time sequence. In the case where the image light color and brightness are satisfied, the control unit controls the first and second light sources 301, 302 to be turned on in a time sequence to save electrical energy, and the life of the light source can be extended.

In combination with the various embodiments described above, the second region of the wavelength conversion unit 303 includes at least two sub-regions, which are a first sub-region 3032 and a second sub-region 3033, respectively. The first sub-region 3032 and the second sub-region 3033 are respectively provided with different wavelength conversion materials. The first sub-region 3032 receives the first light and is excited to generate excited light of a first wavelength range, and the excited light of the first wavelength range is transmitted from the first sub-region 3032; the second sub-region 3033 receives the first light and is excited to generate excited light of a second wavelength range, and the excited light of the second wavelength range is reflected from the second sub-region 3033. Or, the first sub-region 3032 receives the first light and is excited to generate excited light of a first wavelength range, and the excited light of the first wavelength range and the second light are transmitted from the first sub-region 3032; the second sub-region 3033 receives the first light and is excited to generate excited light of a second wavelength range, and the excited light of the second wavelength range is reflected from the second sub-region 3033.

In order to further increase the brightness, the second sub-region of the reflection type may be modified, and a portion of the second sub-region of the reflection type is modified as a transmitting region. That is, the second sub-region includes a transmitting sub-region and a reflecting sub-region. A small portion of the second region is the transmitting sub-region, and the remaining portion is the reflecting sub-region. The transmitting sub-region is for transmitting the second light, and the reflecting sub-region is for reflecting the excited light of the second wavelength range.

Figure 5:
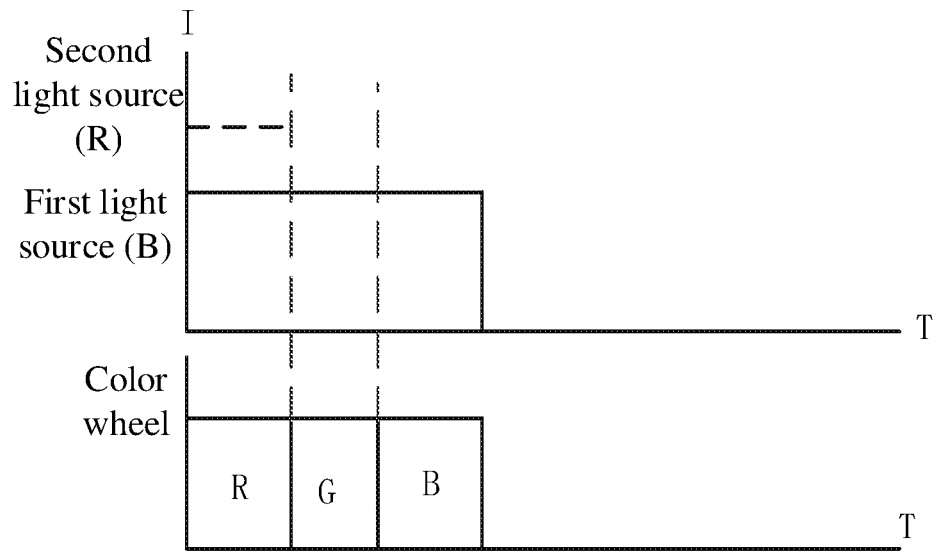
FIG. 5 is a schematic diagram showing a time sequence of lighting of a first light source and a second light source in the light source device of FIG. 3.

As shown in FIG. 5, a schematic diagram showing a time sequence of lighting of the first light source 301 and the second light source 302 in the light source device is illustrated. In one rotation cycle of the wavelength conversion unit 303, the control unit controls the first light source 301 to be always in the on state in the whole cycle, and the control unit controls the second light source 302 to be in an on state only during a period corresponding to a portion of the second region of the wavelength conversion unit 303.

Specifically, referring to FIG. 3 through FIG. 5 and taking a case in which the first light source 301 emits a blue exciting light, and the second light source 302 emits a red exciting light as an example, the control unit controls the first light source 301 to be in the on state in all three regions of the wavelength conversion unit 303; the control unit controls the second light source 302 to be in the on state only during a period corresponding to a portion of the second region of the wavelength conversion unit and in an off state during a period corresponding to the remaining region. In a time-cycle T during which the wavelength conversion unit 303 rotates for one circle, within a time period corresponding to the first region 3031, the blue exciting light emitted by the first light source 301 is incident on the light splitting element 305 and transmitted from the light splitting element 305 into the first region 3031, and the blue exciting light is scattered by the first region 3031 and then emitted in a transmissive manner. In a time period corresponding to the first sub-region 3032, the blue exciting light emitted by the first light source 301 is incident on the light splitting element 305 and transmitted from the light splitting element 305 into the first sub-region 3032, and the first sub-region 3032 receives the blue exciting light and is excited to generate red excited light, and the red excited light is transmitted from the first sub-region 3032 and emitted therefrom; the red exciting light emitted by the second light source 302 is incident on the light splitting element 305 and transmitted from the light splitting element 305 into the first sub-region 3032, and the first sub-region 3032 scatters the red exciting light and then emits it in a transmissive manner. In a time period corresponding to the second sub-region 3033, the blue exciting light emitted by the first light source 301 is incident on the light splitting element 305 and transmitted from the light splitting element 305 into the second sub-region 3033. The second sub-region 3033 receives the blue exciting light and is excited to generate green excited light, and the green excited light is emitted in a reflective manner from the second sub-region 3033 to the light splitting element 305. The light splitting element 305 reflects the green excited light into the first reflecting element 307, and the green excited light is reflected by the first and second reflecting elements 307, 308 and then enters into the light combining element 306. The light emitted from the light combining element 306 is filtered by a light filter unit 309 and then enters a spatial light modulator and is modulated.

Figure 6:
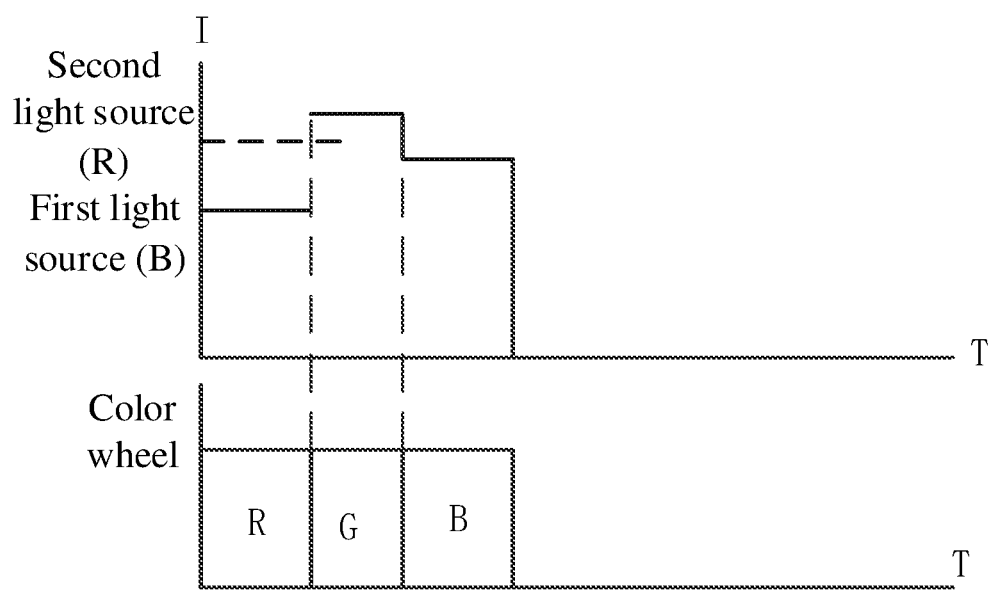
FIG. 6 is a schematic diagram showing another time sequence of lighting of a first light source and a second light source in the light source device of FIG. 3.

A schematic diagram showing another time-sequence of lighting of the first light source 301 and the second light source 302 in the light source device is shown in FIG. 6. The wavelength conversion unit 303 includes a first region 3031, a first sub-region 3032, and a second sub-region 3033. The first sub-region 3032 is provided with a red fluorescent material, and the second sub-region 3033 is provided with a green fluorescent material. In one rotation cycle T of the wavelength conversion unit 303, the control unit controls the first light source 301 to be always in the on state in the whole cycle, and the control unit controls the second light source 302 to be in the on state during a period corresponding to the first sub-region 3032 of the wavelength conversion unit 303 and in the on state during a period corresponding to a portion of the second sub-region 3033 of the wavelength conversion unit 303. Since the first light source 301 is always in the on state in one cycle of the wavelength conversion unit 303, in practical applications, an excitation amount of the excited light can be controlled by adjusting a driving current of the first light source 301. That is, driving current values of the first light source 301 are different in the respective regions of the wavelength conversion unit 303 or different in the periods corresponding to the respective sub-regions.

In the time cycle T in which the wavelength conversion unit 303 rotates for one circle, within the time period corresponding to the first region 3031, the blue exciting light emitted by the first light source 301 is incident on the light splitting element 305 and transmitted from the light splitting element 305 into the first region 3031, and the blue exciting light is scattered in the first region 3031 and then is emitted in a transmissive manner. In the time period corresponding to the first sub-region 3032, the blue exciting light emitted by the first light source 301 is incident on the light splitting element 305 and transmitted from the light splitting element 305 into the first sub-region 3032. The first sub-region 3032 receives the blue exciting light and is excited to generate red excited light, and the red excited light is transmitted from the first sub-region 3032 and emitted therefrom. The red exciting light emitted by the second light source 302 is incident on the light splitting element 305 and transmitted from the light splitting element 305 into the first sub-region 3032. The first sub-region 3032 scatters the red exciting light and then emits it in a transmissive manner. In the time period corresponding to the second sub-region 3033, the blue exciting light emitted by the first light source 301 is incident on the light splitting element 305 and transmitted from the light splitting element 305 into the second sub-region 3033. The second sub-region 3033 receives the blue exciting light and is excited to generate green excited light, and the green excited light is emitted in a reflective manner from the second sub-region 3033 to the light splitting element 305. The light splitting element 305 reflects the green excited light into the first reflecting element 307, and the green excited light is reflected by the first and second reflecting elements 307, 308 and the enters into the light combining element 306. During a period corresponding to a portion of the second sub-region 3033, the red exciting light emitted by the second light source 302 is incident on the light splitting element 305 and transmitted from the light splitting element 305 into the second sub-region 3033, and a corresponding region of the second sub-region 3033, into which the red excited light enters, transmits the red exciting light. It can be understood that a partial region of the second sub-region 3033 is set as a transmitting region that transmits the red exciting light, and a partial region thereof is set as a reflecting region that reflects the green excited light.

Figure 7:
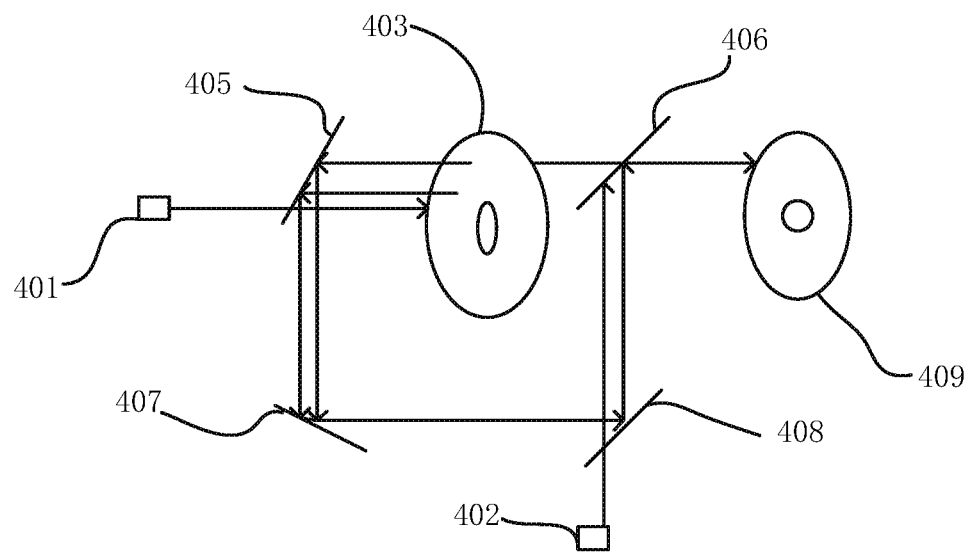
FIG. 7 is another structural schematic diagram of a light source device according to an embodiment of the present disclosure.
Figure 8:
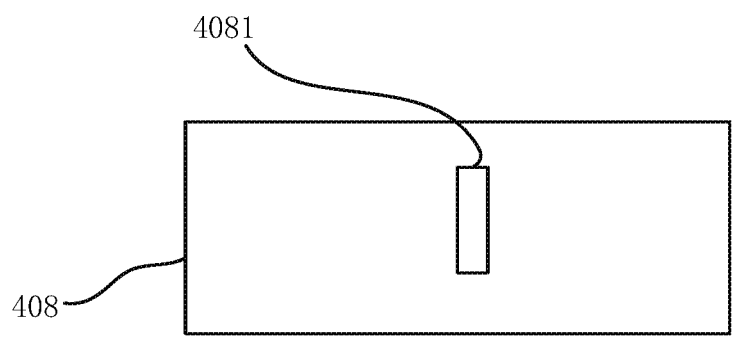
FIG. 8 is a schematic diagram of a reflecting element in the light source device of FIG. 7.

Referring to FIG. 7 and FIG. 8, FIG. 7 is another structural schematic diagram of a light source device according to an embodiment of the present disclosure, and FIG. 8 is a structural schematic diagram of a reflecting element. In this embodiment, positions of the first light source 401 and the second light source 402 are not in the same plane, and the second light emitted by the second light source 402 directly enters into a light combining element 406 without passing through the wavelength conversion unit 303. The above time-sequence turning on manner in which the control unit controls the first light source and the second light source is also applicable to this embodiment. The light source device includes a first light source 401, a second light source 402, a wavelength conversion unit 403, and a light splitting-combining assembly. The light splitting-combining assembly includes a light splitting element 405, a light combining element 406, and a light guiding element.

First light emitted by the first light source 401 is transmitted from the light splitting element 405 into the wavelength conversion unit 403. The wavelength conversion unit 403 has at least two regions. The at least two regions include a first region and a second region. The first region receives the first light, scatters the first light and then emits it in a transmissive manner. The second region receives the first light and is excited to generate excited light of at least one wavelength range. At least a portion of the excited light is reflected from the wavelength conversion unit 403 into the light splitting element 405. The excited light entering the light splitting element 405 is reflected and enters into the light guiding element. The light guiding element guides at least a portion of the excited light into the light combining element 406. The excited light, which is generated by the wavelength conversion unit 403 that is excited, can also be transmitted from the wavelength conversion unit 403 into the light combining element 406. Second light emitted by the second light source 402 is guided by the light guiding element into the light combining element 406. The light combining element 406 converges the incident first light, the second light, and the excited light, and then emits them in the same direction.

On the basis of the above embodiments, the light guiding element may include a first reflecting element 407 and a second reflecting element 408. The first light is transmitted from the light splitting element 405 into the wavelength conversion unit 403, and the second light is transmitted from the second reflecting element 408 into the light combining element 406. The first reflecting element 407 is disposed in an optical path of at least a portion of the excited light emitted by the light splitting element 405, and it reflects at least the portion of the excited light into the second reflecting element 408. The second reflecting element 408 includes a third transmitting region 4081 and a second reflecting region 4082. The third transmitting region 4081 transmits the second light into the light combining element 406. The second reflecting region 4082 reflects at least a portion of the excited light, which is reflected from the first reflecting element 407, to the light combining element 406.

In combination with the above various embodiments, the light source device further includes a light filter unit 409. The light filter unit 409 is disposed on a direction of the emission light of the light combining assembly 406, filters the converged light and emits it.

Figure 9:
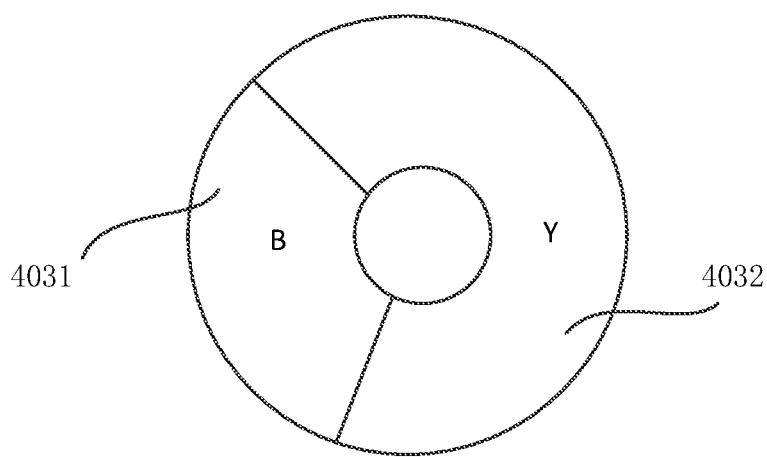
FIG. 9 is a structural schematic diagram of a wavelength conversion unit in the light source device of FIG. 7.

In combination with the above various embodiments, the wavelength conversion unit 403 has two regions. As shown in FIG. 9, the two regions of the wavelength conversion unit 403 are a first region 4031 and a second region 4032, respectively. The first region 4031 is provided with a blue fluorescent material, and it emits light incident on this region in a transmissive manner; or, the first region 4031 is provided with a scattering material, scatters the light incident on this region and emits it in a reflective manner. The second region 4032 is provided with a yellow fluorescent material and is excited by light incident on this region so as to generate yellow excited light, and the yellow excited light is emitted in a reflective manner; or, the light incident on the second region 4032 is reflected and then emitted directly without generating excited light.

Figure 10:
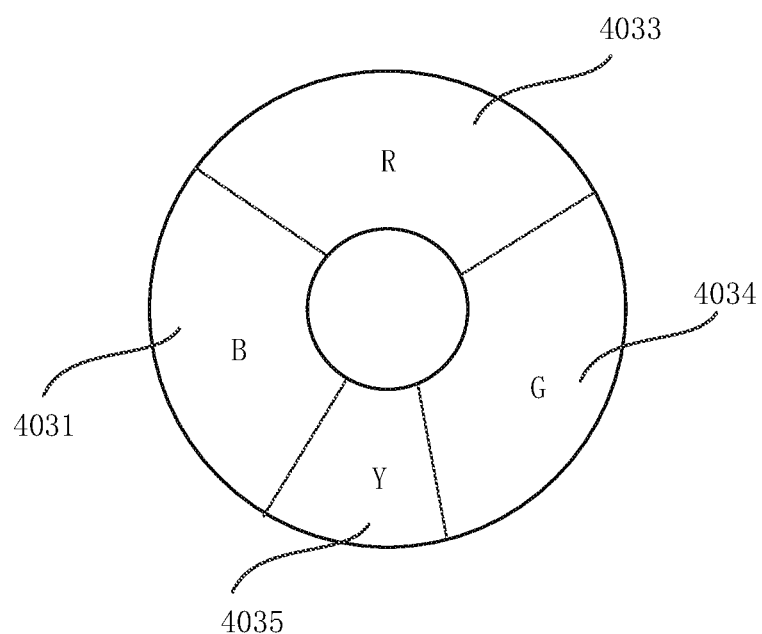
FIG. 10 is a structural schematic diagram of a wavelength conversion unit in the light source device of FIG. 7.

As shown in FIG. 10, the wavelength conversion unit 403 has four regions, and the four regions of the wavelength conversion unit 403 are a first region 4031, a third region 4033, a fourth region 4034, and a fifth region 4035, respectively. The first region 4031 is provided with a blue fluorescent material, and light incident on this region is emitted in a transmissive manner; or, the first region 4031 is provided with a scattering material, scatters the light incident on this region and emits it in a reflective manner. The third region 4033 is provided with a red fluorescent material, and it is excited by the light incident on this region to generate red excited light, and the red excited light is emitted in a reflective manner. The fourth region 4034 is provided with a green fluorescent material, and it is excited by the light incident on this region to generate green excited light, and the green excited light is emitted in a reflective manner. The fifth region 4035 is provided with a yellow fluorescent material, and it is excited by the light incidenton this region to generate yellow excited light, and the yellow excited light is emitted in a reflective manner.

Figure 11:
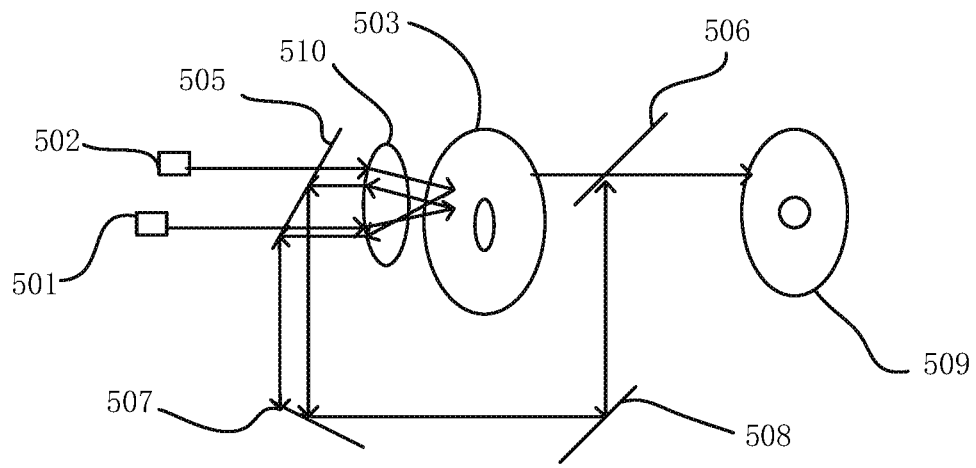
FIG. 11 is still another structural schematic diagram of a light source device according to an embodiment of the present disclosure.

Referring to FIG. 11, FIG. 11 is still another structural schematic diagram of the light source device. The light source device includes a first light source 501, a second light source 502, a wavelength conversion unit 503, and a light splitting-combining assembly. The first light source 501 is used to emit first light. The wavelength conversion unit 503 has at least two regions, and the at least two regions include a first region and a second region. The first region receives the first light, scatters the first light and then emits it. The second region receives the first light and is excited to generate excited light of at least one wavelength range. For example, the second region of the wavelength conversion unit 503 receives the first light and is excited to generate yellow excited light. As another example, the second region of the wavelength conversion unit 503 receives the first light and is excited to generate red excited light and green excited light. It can be understood that the red excited light is excited light of a wavelength range, and the green excited light is excited light of another wavelength range, and the yellow excited light is excited light of still another wavelength range. That is, when the wavelength range of the generated excited light is divided, the color displayed by the excited light is used as a boundary. The second light source 502 is used to emit second light, and a wavelength range of the second light is in the wavelength range of the excited light. That is to say, the first light and the excited light generated by excitation of the first light include three primary colors of red, green, and blue required for an image display, and the second light emitted by the second light source 502 is used to supplement the image light. The light splitting-combining assembly is used to converge the light emitted from the wavelength conversion unit 503 and the second light, to cause the converged light to be emitted in the same direction.

The light splitting-combining assembly includes a light splitting element 505, a light combining element 506, a first reflecting element 507 and a second reflecting element 508. The light splitting element 505 is disposed on an emission optical path of the first light, for transmitting the first light and the second light and reflecting at least a portion of the excited light. The first and second reflecting elements 507 and 508 guide the excited light, which is emitted from the light splitting element 305 in a reflective manner, to the light combining element 306. Specifically, the first reflecting element 507 is disposed in the optical path of at least a portion of the excited light emitted by the light splitting element 505, and it reflects at least the portion of the excited light into the second reflecting element 508. The second reflecting element 508 reflects at least a portion of the excited light, which is reflected from the first reflecting element 507, to the light combining element 506. The light combining element 506 converges the incident first light, the excited light, and the second light into one beam of light and then emits it in the same direction.

Figure 12:
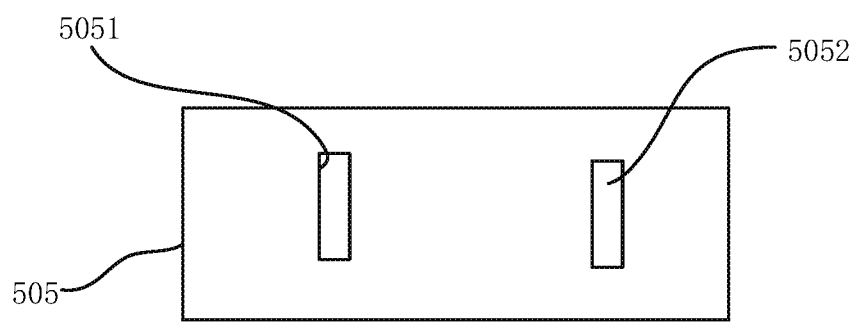
FIG. 12 is a schematic diagram of a light splitting element in the light source device of FIG. 11.

Referring to FIG. 12, the light splitting element 505 includes a first transmitting region 5051, a second transmitting region 5052, and a first reflecting region 5053. First light emitted by the first light source 501 is transmitted from the first transmitting region 5051 into the wavelength conversion unit 503. Second light emitted by the second light source 502 is transmitted from the second transmitting region 5052 into the wavelength conversion unit 503. The first reflecting region 5053 is for reflecting at least a portion of the excited light. The excited light emitted from the wavelength conversion unit 503 in a reflective manner is incident on the first reflection region 5053 and is emitted in a reflective manner.

In combination with the above various embodiments, the light source device may further include a light filter unit 509 and a light modulating unit 510. The light filter unit 509 is disposed in the emission light of the light combining element 506, filters the light converged by the light combining element 506 and emits it. The light modulating unit 510 is disposed in an emission direction of the transmitted light of the light splitting element 505, focuses the incident light and then emits it to the wavelength conversion unit 503, and emits the light, which is reflected by the wavelength conversion unit 503, to the light splitting element 505 in parallel. The light modulating unit 510 can be a lens.

An embodiment of the present disclosure further provides a projection display system, and the projection display system includes the light source device of any of the above embodiments.

What have been described above are only embodiments of the present disclosure, and it should be noted herein that one ordinary person skilled in the art can make improvements without departing from the inventive concept of the present disclosure, but these are all within the scope of the present disclosure.

What is claimed is:

1. A light source device, comprising:
a first light source configured to emit first light;
a wavelength conversion unit having at least two regions, wherein the at least two regions comprise a first region and a second region, the first region is configured to receive the first light, scatter the first light and then emit it, and the second region is configured to receive the first light and be excited to generate excited light; the first region and the second region emit the first light and the excited light in a time-sequence manner;
a second light source configured to emit second light, wherein a wavelength range of the second light is within a wavelength range of the excited light;
a light splitting-combining assembly configured to guide the first light, the excited light and the second light, so as to cause the first light to be incident on the at least two regions of the wavelength conversion unit in a time-sequence manner and cause the first light and the excited light which are emitted from the wavelength conversion unit and the second light to be converged and then be emitted in a same direction,
wherein the excited light comprises light having a same color as the second light and light having a different color from the second light;
the light splitting-combining assembly is configured to guide the first light from a first side of the wavelength conversion unit to the wavelength conversion unit, the wavelength conversion unit is configured to emit scattered first light from a second side different from the first side of the wavelength conversion unit, and the wavelength conversion unit is further configured to emit, from the first side of the wavelength conversion unit, excited light generated by excitation;
the light splitting-combining assembly is configured to combine, in etendue, the light emitted from the first side of the wavelength conversion unit with the second light, and then combine, in wavelength, the light that has been combined in etendue with the light emitted from the second side of the wavelength conversion unit;
wherein the light splitting-combining assembly comprises a light splitting element, a light guiding element and a light combining element;
the light splitting element is disposed on an emission optical path of the first light and is configured to transmit the first light and reflecting light emitted from the first side of the wavelength conversion unit;
the light guiding element is configured to guide the light, that is emitted from the light splitting element after being reflected, to the light combining element;
the light combining element is configured to converge light guided-in by the light guiding element and light emitted from the second side of the wavelength conversion unit into one beam of light and then emit it in a same direction; and wherein the light guiding element comprises a reflecting element, the reflecting element comprises a transmitting region and a reflecting region, configured to combine, in etendue, the light emitted from the first side of the wavelength conversion unit with the second light.

2. The light source device according to claim 1, wherein the wavelength conversion unit is configured to emit scattered first light to the light combining element and emit the excited light to the light splitting element.

3. The light source device according to claim 2, wherein the light guiding element comprises a first reflecting element and a second reflecting element, the first light is transmitted from the light splitting element to be incident on the wavelength conversion unit, and the second light is transmitted from the second reflecting element into the light combining element;

the first reflecting element is disposed on an optical path of at least a portion of excited light emitted by the light splitting element, and is configured to reflect at least the portion of the excited light into the second reflecting element;

the second reflecting element comprises a third transmitting region and a second reflecting region, the third transmitting region is configured to transmit the second light into the light combining element, and the second reflecting region is configured to reflect at least a portion of excited light, that is reflected from the first reflecting element, to the light combining element.

4. The light source device according to claim 1, further comprising a control unit, and the control unit is configured to control the first light source and the second light source to be turned on or turned off in a time-sequence manner.

5. The light source device according to claim 4, wherein during one rotation cycle of the wavelength conversion unit, the control unit is configured to control the first light source to be maintained in a turned-on state in one cycle, and control the second light source to be in a turned-on state only during a period corresponding to a portion of the second region of the wavelength conversion unit.

6. The light source device according to claim 4, wherein the second region comprises at least a first sub-region and a second sub-region, the first sub-region is provided with a red fluorescent material, and the second sub-region is provided with a green fluorescent material;

during one rotation cycle of the wavelength conversion unit, the control unit is configured to control the first light source to be maintained in a turned-on state in one cycle, and the control unit is configured to control the second light source to be in a turned-on state during a period corresponding to the first sub-region of the wavelength conversion unit and in the turned-on state during a period corresponding to a portion of the second sub-region of the wavelength conversion unit.

7. The light source device according to claim 6, wherein driving current values of the first light source are different in time periods respectively corresponding to the first region of the wavelength conversion unit, the first sub-region of the wavelength conversion unit and the second sub-region of the wavelength conversion unit.

8. The light source device according to claim 1, wherein the second region comprises at least a first sub-region and a second sub-region, and the first sub-region and the second sub-region are respectively provided with different wavelength conversion materials.

9. The light source device according to claim 8, wherein the first sub-region is configured to receive the first light and be excited to generate excited light of a first wavelength range, and the excited light of the first wavelength range is transmitted from the first sub-region; the second sub-region is configured to receive the first light and be excited to generate excited light of a second wavelength range, and the excited light of the second wavelength range is reflected and emitted from the second sub-region or, the first sub-region is configured to receive the first light and be excited to generate excited light of a first wavelength range, the excited light of the first wavelength range and the second light are transmitted from the first sub-region, the second sub-region is configured to receive the first light and be excited to generate excited light of the second wavelength range, and the excited light of the second wavelength range is reflected and emitted from the second sub-region.

10. The light source device according to claim 9, wherein the second sub-region comprises a transmitting sub-region and a reflecting sub-region, the transmitting sub-region is configured to transmit the second light, and the reflecting sub-region is configured to reflect the excited light of the second wavelength range.

11. The light source device according to claim 1, further comprising a light filter unit, and the light filter unit is disposed in a direction of an emission light of the light splitting-combining assembly, and is configured to filter and emit the converged light.

12. A light source device, comprising:
a first light source configured to emit first light;
a wavelength conversion unit having at least two regions, wherein the at least two regions comprise a first region and a second region, the first region is configured to receive the first light, scatter the first light and then emit it, and the second region is configured to receive the first light and be excited to generate excited light; the first region and the second region emit the first light and the excited light in a time-sequence manner;
a second light source configured to emit second light, wherein a wavelength range of the second light is within a wavelength range of the excited light;
a light splitting-combining assembly configured to guide the first light, the excited light and the second light, so as to cause the first light to be incident on the at least two regions of the wavelength conversion unit in a time-sequence manner and cause the first light and the excited light which are emitted from the wavelength conversion unit and the second light to be converged and then be emitted in a same direction,
wherein the excited light comprises light having a same color as the second light and light having a different color from the second light;
the light splitting-combining assembly is configured to guide the first light and the second light from a first side of the wavelength conversion unit to the wavelength conversion unit, the wavelength conversion unit is configured to emit scattered first light, the excited light having the same color as the second light, and the second light from a second side different from the first side of the wavelength conversion unit, and the wavelength conversion unit is configured to emit the excited light having the different color from the second light from the first side of the wavelength conversion unit;
the light splitting-combining assembly is configured to combine the lights in wavelength, wherein the lights comprise light emitted from the first side of the wavelength conversion unit and light emitted from the second side of the wavelength conversion unit;

wherein the light splitting-combining assembly comprises a light splitting element, a light guiding element and a light combining element;

the light splitting element is disposed on an emission optical path of the first light and is configured to transmit the first light and the second light and reflecting light emitted from the first side of the wavelength conversion unit;

the light guiding element is configured to guide the light, that is emitted from the light splitting element after being reflected, to the light combining element;

the light combining element is configured to converge light guided-in by the light guiding element and light emitted from the second side of the wavelength conversion unit into one beam of light and then emit it in a same direction.

13. The light source device according to claim 12, wherein
the wavelength conversion unit is configured to emit scattered first light to the light combining element and emit at least a portion of the excited light to the light splitting element and emit a remaining portion to the light combining element.

14. The light source device according to claim 13, wherein the light splitting element comprises a first transmitting region, a second transmitting region, and a first reflecting region;
the first light is transmitted from the first transmitting region into the wavelength conversion unit, the second light is transmitted from the second transmitting region into the wavelength conversion unit, and light emitted from the first side of the wavelength conversion unit is reflected by the first reflecting region to the light guiding element.

15. A light source device, comprising:
a first light source configured to emit first light;
a wavelength conversion unit having at least two regions, wherein the at least two regions comprise a first region and a second region, the first region is configured to receive the first light, scatter the first light and then emit it, and the second region is configured to receive the first light and be excited to generate excited light; the first region and the second region emit the first light and the excited light in a time-sequence manner;
a second light source configured to emit second light, wherein a wavelength range of the second light is within a wavelength range of the excited light;
a light splitting-combining assembly configured to guide the first light, the excited light and the second light, so as to cause the first light to be incident on the at least two regions of the wavelength conversion unit in a time-sequence manner and cause the first light and the excited light which are emitted from the wavelength conversion unit and the second light to be converged and then be emitted in a same direction,
wherein the excited light comprises light having a same color as the second light and light having a different color from the second light;
the light splitting-combining assembly is configured to guide the first light and the second light from a first side of the wavelength conversion unit to the wavelength conversion unit, the wavelength conversion unit is configured to emit scattered first light, the excited light having the same color as the second light, and the second light from the first side of the wavelength conversion unit, and the wavelength conversion unit is configured to emit the excited light having the different color from the second light from a second side different from the first side of the wavelength conversion unit;

the light splitting-combining assembly is configured to combine the lights emitted from the first side and the second side of the wavelength conversion unit;

wherein the light splitting-combining assembly comprises a light splitting element, a light guiding element and a light combining element;

the light splitting element is disposed on an emission optical path of the first light and is configured to transmit the first light and the second light and reflecting light emitted from the first side of the wavelength conversion unit;

the light guiding element is configured to guide the light, that is emitted from the light splitting element after being reflected, to the light combining element;

the light combining element is configured to converge light guided-in by the light guiding element and light emitted from the second side of the wavelength conversion unit into one beam of light and then emit it in a same direction.

16. The light source device according to 15, wherein
the wavelength conversion unit is configured to emit scattered first light to the light splitting element and emit at least a portion of the excited light to the light splitting element and emit a remaining portion to the light combining element.

17. A projection display system, comprising a light source device, the light source device comprising:
a first light source configured to emit first light;
a wavelength conversion unit having at least two regions, wherein the at least two regions comprise a first region and a second region, the first region is configured to receive the first light, scatter the first light and then emit it, and the second region is configured to receive the first light and be excited to generate excited light; the first region and the second region emit the first light and the excited light in a time-sequence manner;
a second light source configured to emit second light, wherein a wavelength range of the second light is within a wavelength range of the excited light;
a light splitting-combining assembly configured to guide the first light, the excited light and the second light, so as to cause the first light to be incident on the at least two regions of the wavelength conversion unit in a time-sequence manner and cause the first light, the excited light which is emitted from the wavelength conversion unit and the second light to be converged and then be emitted in a same direction,
wherein the excited light comprises light having a same color as the second light and light having a different color from the second light;
the light splitting-combining assembly is configured to guide the first light from a first side of the wavelength conversion unit to the wavelength conversion unit, the wavelength conversion unit is configured to emit scattered first light from a second side different from the first side of the wavelength conversion unit, and the wavelength conversion unit is further configured to emit, from the first side of the wavelength conversion unit, excited light generated by excitation;
the light splitting-combining assembly is configured to combine, in etendue, the light emitted from the first side of the wavelength conversion unit with the second light, and then combine, in wavelength, the light that has been combined in etendue with the light emitted from the second side of the wavelength conversion unit;

wherein the light splitting-combining assembly comprises a light splitting element, a light guiding element and a light combining element;

the light splitting element is disposed on an emission optical path of the first light and is configured to transmit the first light and reflecting light emitted from the first side of the wavelength conversion unit;

the light guiding element is configured to guide the light, that is emitted from the light splitting element after being reflected, to the light combining element;

the light combining element is configured to converge light guided-in by the light guiding element and light emitted from the second side of the wavelength conversion unit into one beam of light and then emit it in a same direction; and wherein the light guiding element comprises a reflecting element, the reflecting element comprises a transmitting region and a reflecting region, configured to combine, in etendue, the light emitted from the first side of the wavelength conversion unit with the second light.

* * * * *